(12) United States Patent
Howell et al.

(10) Patent No.: US 6,226,374 B1
(45) Date of Patent: May 1, 2001

(54) CAPACITY PROVISIONING FOR AIN

(75) Inventors: Robert B. Howell, Superior, CO (US);
Mark Choey, Teaneck, NJ (US);
Xiaojiang Lu, Broomfield; Jeffrey C. Mitchell, Denver, both of CO (US);
Neil K. Nelson, Austin, TX (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/198,941

(22) Filed: Nov. 24, 1998

(51) Int. Cl.[7] ........................................... H04M 3/42
(52) U.S. Cl. ............................ 379/207; 379/201; 379/229
(58) Field of Search ................................. 379/207, 201, 379/219, 229, 230

(56) References Cited

U.S. PATENT DOCUMENTS

| | | | | |
|---|---|---|---|---|
| 5,241,588 | * | 8/1993 | Babson, III | 379/127 X |
| 5,771,273 | * | 6/1998 | McAllister et al. | 379/202 X |
| 5,771,279 | * | 6/1998 | Cheston, III et al. | 379/201 X |
| 5,802,146 | * | 9/1998 | Dulman | 379/120 X |
| 5,958,016 | * | 9/1999 | Chang et al. | 709/229 |
| 6,161,128 | * | 12/2000 | Smyk | 709/205 |

* cited by examiner

*Primary Examiner*—Creighton Smith
(74) *Attorney, Agent, or Firm*—Brooks & Kushman P.C.

(57) ABSTRACT

Existing and new service provisioning capacity in an AIN is determined by calculating processor utilization. Existing service demand and component usage information is automatically acquired from the AIN. ISP service data and SCP configuration descriptions are updated as needed. For each new service modeled, a call processing record is developed. A time of day usage for each service is also entered. For each city in the region covered by the AIN, demand forecasts for each new service in the city is determined. Utilization is determined for SCPs, ISPs, and SPACE systems provisioning capacity.

10 Claims, 3 Drawing Sheets

CAPACITY PROVISIONING FOR AIN

TECHNICAL FIELD

The present invention relates to capacity sizing of elements in advanced intelligent networks.

BACKGROUND ART

An AIN provides at least one service control point (SCP) along with a service provisioning and creation environment (SPACE) system. The SCP contains the logic to control how AIN services are performed. The SPACE system contains call processing records (CPRs) which include the logic building blocks assembled for each service and specified for a given customer. Intelligent service peripherals (ISPs) provide input and output services to users. Each ISP is connected to one SCP. Users are connected to the AIN through signal switching points (SSPs). Each SSP accesses an ISP through primary rate interface (PRI) trunks.

One benefit of AIN is the ability to provide users with a variety of services such as remote access forwarding, select call routing, do not disturb, single number service, and wireless extension. Loads generated by services vary as a function of time and as a function of city within the region covered by the AIN. The degree to which services affect components in the AIN can be expressed by processor utilization in components such as SCPS, ISPs, and SPACE systems, and capacity overload in components such as PRI trunks.

What is needed is a capacity provisioning for an AIN that can support a mix of services from different geographic locations served by multiple SCPs. The affect on databases and services as well as CPU utilization should be determined.

SUMMARY OF THE INVENTION

It is an object of the present invention to determine CPU utilization in AIN components including SCPs, ISPS, and SPACE systems.

Another object of the present invention is to calculate overload of PRI trunk groups connected to ISPs.

Still another object of the present invention is to indicate when various thresholds have been reached on AIN nodes.

Yet another object of the present invention is to allow users to trace the CPU utilization to the services and cities responsible for generating the load resulting in CPU utilization.

A further object of the present invention is to allow new components to be modeled, loads redistributed, and impacts assessed.

A still further object of the present invention is to allow the loads from different peak hours of different services from cities in different time zones to be added.

In carrying out the above objects and other objects and features of the present invention, a method is provided for determining existing service and new service provisioning capacity. The method includes automatically acquiring existing service demand and component usage information from the AIN, specifying service demand and component usage information for each ISP, updating a configuration description for each SCP having a modified configuration, specifying a call processing record for each new service, and specifying time of day usage for each service. For each city in the region covered by the AIN, demand forecasts for each new service in the city is determined. Utilization is determined for components such as SCPs, ISPs, and SPACE systems, the utilization indicative of provisioning capacity.

In one embodiment, the method further comprises selecting at least one service to be used in determining utilization and specifying a time range over which utilization will be determined.

In another embodiment, acquiring existing service demand and component usage information from the AIN includes periodically extracting and storing time usage data from each SPACE system, periodically extracting and storing calls per customer data from each SCP, and loading the stored time usage data and the stored calls per customer data.

In yet another embodiment, determining utilization includes normalizing time in each city to compensate for time differences across the more than one time zone.

In a further embodiment, the method of the present invention includes storing changes to service demands and to time of day usage in a change log.

In a preferred embodiment, all of the above embodiments are included.

A system is also provided in accordance with the present invention for capacity provisioning. The system includes an application tool database, an acquisition module to periodically acquire existing service demand data and component usage data from the AIN and to store the data in the application tool database, and at least one modeling station. Each modeling station can load data from the application tool database, permit ISP demand and usage to be updated, permit a configuration description to be updated for each SCP, permit a call processing record to be specified for each new service if any new service exists, and permit a time of day usage to be specified for each service. For each city in the region spanned by the AIN, a demand forecast is determined for each new service. Utilization is determined for at least one network component, the utilization indicative of provisioning capacity.

The above objects and other objects, features, and advantages of the present invention are readily apparent from the following detailed description of the best mode for carrying out the invention when taken in connection with the accompanying drawings.

BEST MODES FOR CARRYING OUT THE INVENTION

Figure 1:
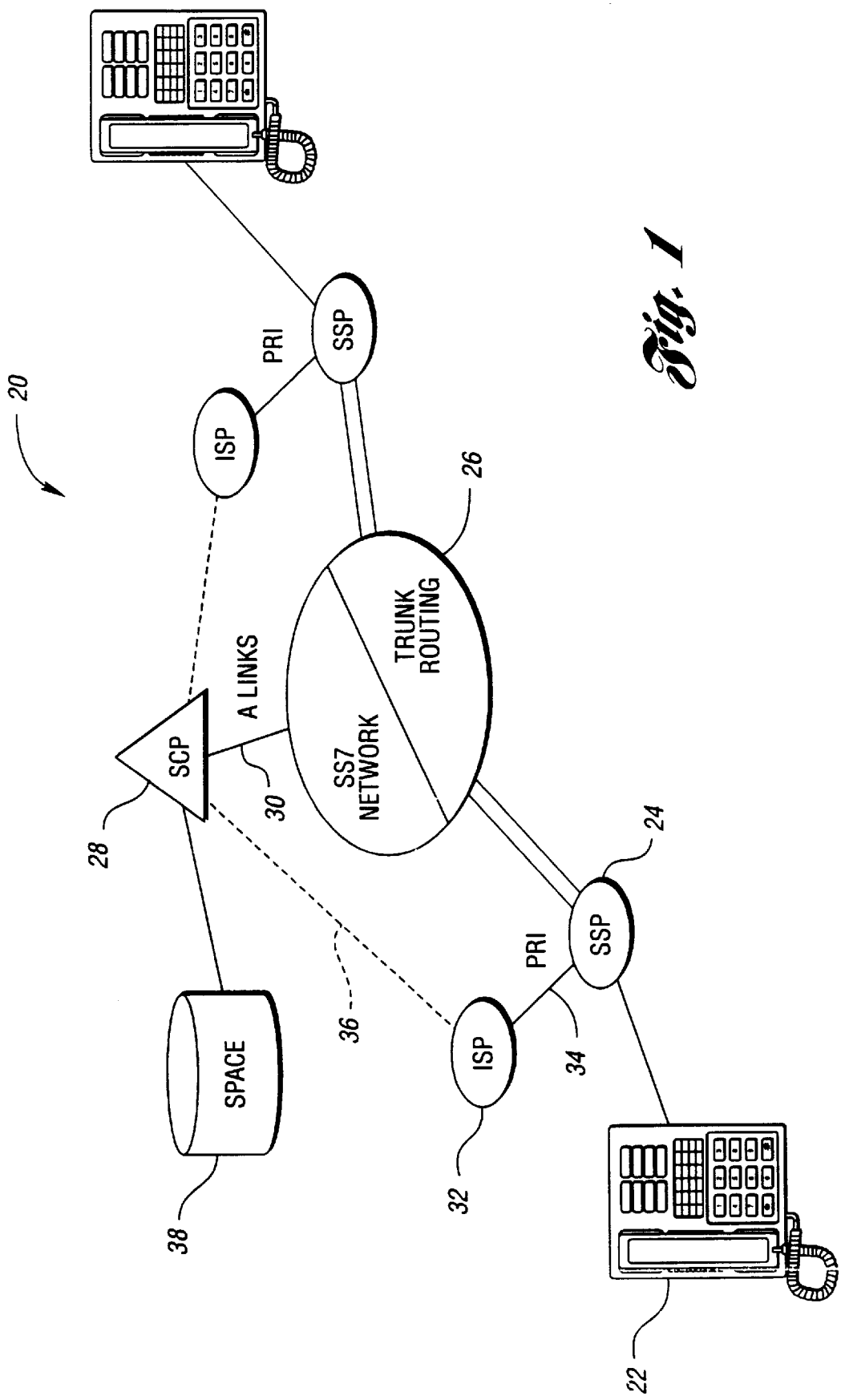
FIG. 1 is a block diagram of an AIN.

Referring now to FIG. 1, a block diagram of an AIN is shown. An advanced intelligent network (AIN), shown generally by 20, services telecommunication users, one of which is represented by 22. Users are directly connected to SSP 24. Calls between SSPs 24 may be routed along voice-data trunks between service switching points (SSPs) in network 26. SSPs are further operative to perform out-of-band signaling through an interconnected system of signal transfer points (STPs) in the SS7 component of network 26. STPs are connected to intelligent service control points (SCPs), one of which is shown by 28, through A links 30 in the SS7 network. SCP 28 responds to queries for information related to the disposition of a call or a service.

SCP 28 has service logic that controls the functioning of a service. SSP 24 contains a software trigger which, when certain call criteria are met, sends a query to SCP 28. SCP 28 service logic and data are then accessed and utilized. SCP 28 responds to the service request by executing the corresponding call processing record (CPR). Each CPR consists of a set of decision nodes and action branches. Action branches may include such tasks as make announcement, acquire input from user 22, perform number translation, make connection, disconnect, and the like. Decisions are based on responses from user 22, stored coefficients, and the like. Each action or decision requires processor utilization, expressed as AIN call units. The utilization of processors in SCP 28 can be determined as the percent utilization, of which the overload threshold is related to the number of AIN call units per second which can be handled by SCP 28.

SCP 28 has a mated pair architecture, providing fault tolerance. If there is a failure in either half of the mated pair, a situation known as a single failure mode, the load is automatically shifted to the other half of SCP 28. Each half of SCP 28 has a plurality of processors (central processing units, CPUs). If, in addition, there is a failure of one of the CPUs in the remaining half, known as a double failure, the processing load is shifted to the remaining operating processors. SCP 28 is designed such that, under normal load conditions, a double failure will result in no greater than 85% utilization of the remaining operating processors. This design requirement results in significantly lower CPU utilization as a maximum for each processor when SCP 28 is fully operational.

Intelligent service peripheral (ISP) 32 is connected to SSP 24 through primary rate interface (PRI) 34. ISP 32 is connected to SCP 28 through TCP/IP network connection 36. ISP 32 supports services to user 22 such as, for example, voice recognition, digit collection, and the like. Services provided by ISP 32 are described by programs broken into small tasks such as collect digit, play message, get data, and route calls. ISP 32 includes at least one processor for executing ISP programs.

Services generally create loads distributed to available SCPs 28, to ISPs 32, and associated trunk groups such as PRI 34. Services are also generally divided into two parts, a caller portion designated as the SS7 part and an intelligent peripheral portion designated as the IP part. The usage pattern and number of activations per hour can be and often are different for the two parts. In addition, the impact of these two parts are quite different due to the increased number of dual tone multifrequency (DTMF) updates on the IP part by user 22. The DTMF updates require greater CPU utilization to process. Thus the IP part of a service will normally contribute more strongly to the overall impact of the service even though the number of activations per hour is much less than the SS7 part.

Services have a usage distribution over a week, with peaks occurring at particular hours on particular days. Services also have a demand given in terms of number of subscribers and the number of calls per subscriber per average day. Service demand may also be expressed in terms of geographic areas, typically by city.

One database served through SCP 28 is the service provisioning and creation environment (SPACE) system 38. SPACE system 38 provides the service creation environment as well as the database for storing CPRs and other AIN service information. There is a maximum amount of memory available to store CPRs on SPACE system 38.

SPACE system 38 has a maximum number of service provisionings per hour that can be supported if no other load is imposed on SCP 28 to which SPACE system 38 is attached. This provisioning rate is known as the SPACE update rate.

Figure 2:
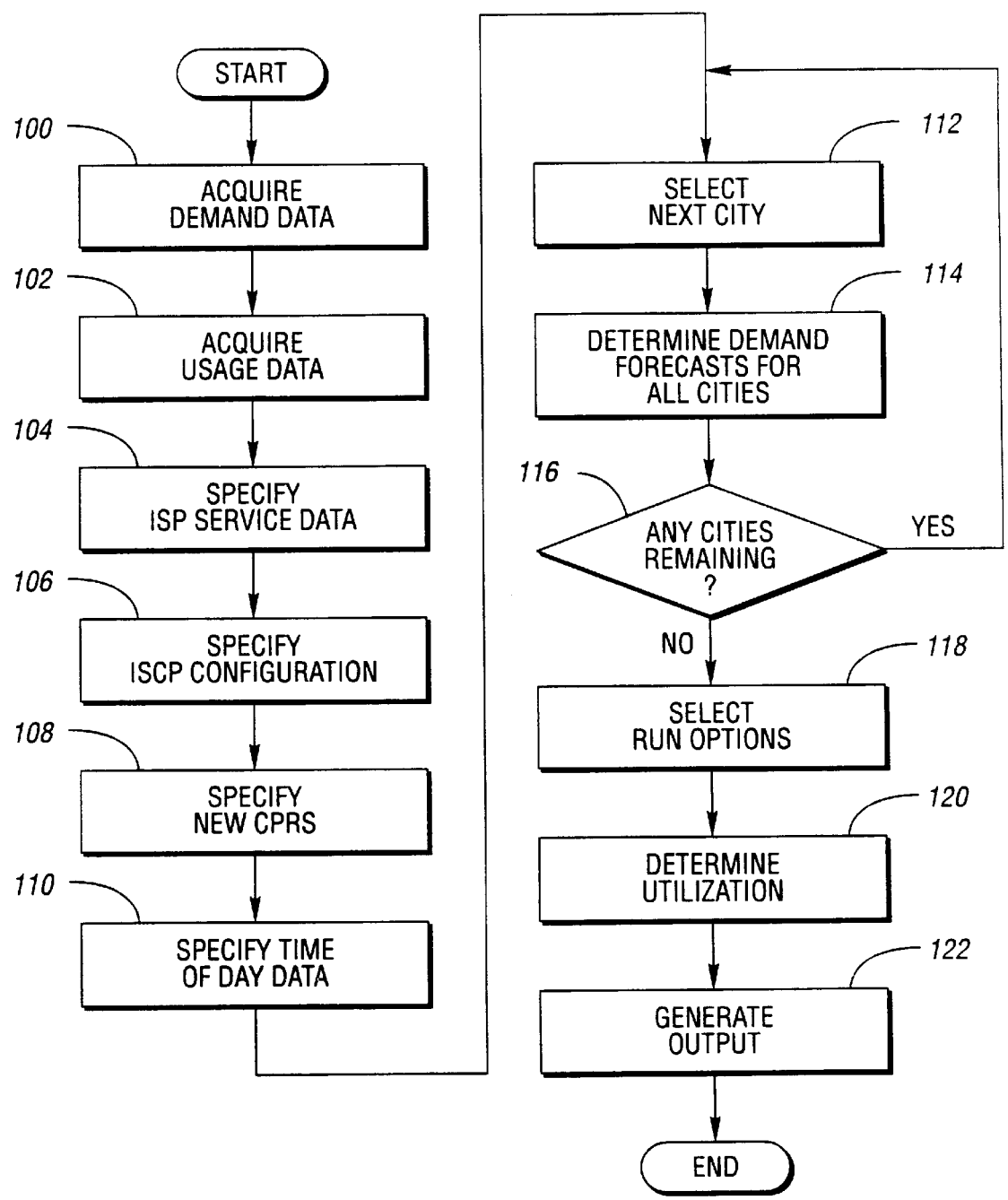
FIG. 2 is a flow diagram of a method for capacity planning according to the present invention.

Referring now to FIG. 2, a flow diagram of a method for capacity provisioning according to the present invention is shown. As will be appreciated by one of ordinary skill in the art, the operations illustrated are not necessarily sequential operations. Similarly, operations may be performed by software, hardware, or a combination of both. The present invention transcends any particular implementation and aspects are shown in sequential flow chart forms for ease of illustration.

Demand is acquired in block 100. The demand for each service in each city is acquired. SCP 28 is periodically polled for demand data. The demand data is stored in a database until needed.

Usage data is acquired in block 102. A tabulation of access to each CPR is kept in corresponding SPACE system 38. This tabulation indicates the number of times each action branch is executed in each CPR. SPACE system 38 is periodically polled for usage data. The usage data is stored in a database until needed.

ISP service data is specified in block 104. The collection of tasks that are required to complete each service performed by ISP 32 must be specified. This includes branching probabilities and processor requirements. ISP service data is held in a database and only new ISP services or changes to existing ISP services need be specified each simulation.

SCP configuration is specified in block 106. Each SCP 28 has configuration parameters that affect how it will perform. These configuration parameters include the number of processors, software release number, number of A links 30 connected to SCP 28, additional databases creating load on SCP 28, and the like. The configuration of each SCP is held in a database and only new configurations or changes to existing configurations need be specified each simulation.

New CPRs are specified in block 108. If any new services are to be modeled, a CPR for each new service must be entered. Probabilities for branching nodes must also be entered.

Time of day usage is specified in block 110.

A description of how each service will be used is provided. For each service in each city, the percentage of an average load for each day in the week and for each hour in the day is entered.

A city in the region covered by AIN 20 is selected in block 112. Each city includes a number of users 22 in the city as a function of time. For each new service, demand is forecasted for the city in block 114. The result of this forecast is the number of calls per average day for each service in the selected city. A check for remaining cities is made in block 116. If any cities remain, the next city is selected. If no cities remain, demand for each new service by city has been determined.

Run options are selected in block 118. Run options include the one or more services for which simulation is desired and the simulated length of time for the study. Additionally, the component for which simulation is desired is specified. At least one component from a set including SCP 28, ISP 32, and SPACE system 38 may be selected.

Utilization is determined in block 120. For each service in each city, the number of requests in peak hours is obtained from the demand for new or modified services or from the actual demand for existing services and from the time of day usage. A description of the service, such as the CPR or ISP program, provides the decisions and operations required for the service. Using coefficients indicating the number of AIN call units required for each operation and decision and the path probabilities through the logic flow, the number of AIN call units per service is determined. Multiplying the number of AIN call units per service by the number of requests in peak hours for each service in each city produces the peak AIN call load for each service by each city. Summing over ail cities and normalizing for the time base for AIN call units yields utilization. For SCP 28, the SCP configuration can be used to find utilization for each processor.

In a preferred embodiment, cities throughout multiple time zones are modeled by normalizing time in each city to compensate for time differences across the time zones.

Output is generated in block 122. Reports and graphs are generated illustrating utilization and capacity exceptions. If SCP information is desired, processor utilization under no failure, single failure, and double failure is shown. The CPU utilization threshold as a given percentage for the no failure scenario is also provided. The DTMF update rate during peak hours is available. If ISP information is desired, the number of PRI trunks 34 required and the blocking percentage are provided.

Figure 3:
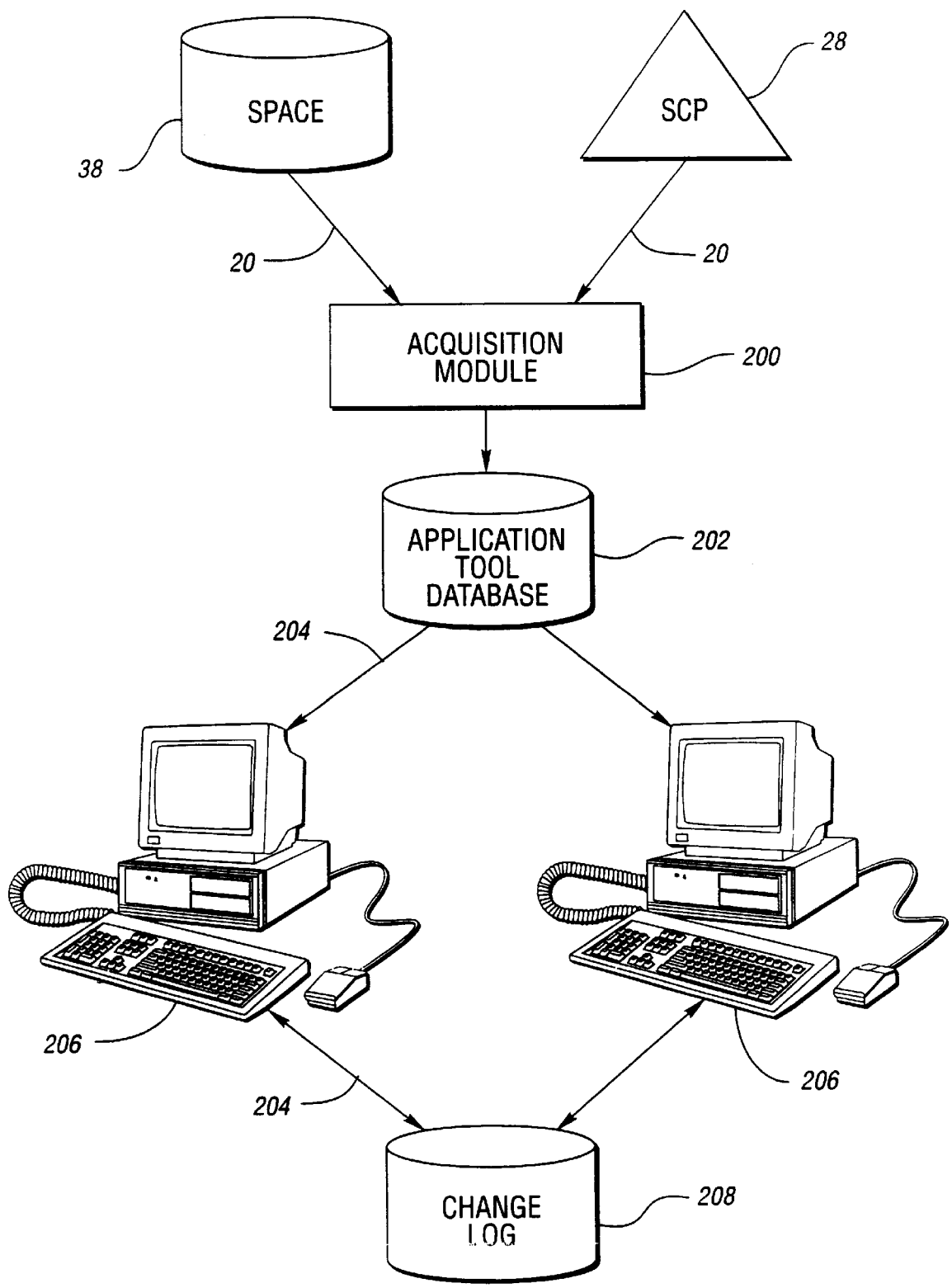
FIG. 3 is a block diagram of a system for capacity provisioning according to the present invention.

Referring now to FIG. 3, a block diagram of a system for capacity provisioning according to the present invention is shown. SCP 28 and SPACE system 38 continuously collect information on service demand and usage. Demand includes the number of requests for a service over a given time period. Usage includes the branching taken in each CPR and ISP program.

Periodically, acquisition module 200 accesses SCP 28 and SPACE system 38 through AIN 20. Acquisition module 200 collects demand and usage data, formats the data, and stores the data in application tool database 202. In a preferred embodiment, acquisition module 200 is implemented on a UNIX system.

At least one modeling station 206 is connected to application tool database 202 using data network 204. Each modeling station 206 is operable to allow a modeler to specify data, select options, determine utilization and generate output as described with regards to FIG. 2 above. In a preferred embodiment, modeling station 206 is a workstation such as, for example, a SUN SPARCSTATION, or is a personal computer such as, for example, an APPLE MACINTOSH or the like.

Change log 208 is connected to each modeling station 206 by data network 204 and contains modified information such as CPRs and ISP service data and customer demand data. Any changes made to SCP configurations or proposed services are recorded in change log 208. In the preferred embodiment, change log 208 is incorporated with application tool database 202.

While the best modes for carrying out the invention have been described in detail, those familiar with the art to which this invention relates will recognize various alternative designs and embodiments for practicing the invention as defined by the following claims.

What is claimed is:

1. In an advanced intelligent network (AIN) comprising at least one intelligent service control point (SCP), each SCP having a configuration, a service provisioning and creation environment (SPACE) system in communication with each SCP, at least one intelligent service peripheral (ISP), each ISP in communication with one SCP, a plurality of SSPs providing connections into the AIN to users, each SSP in communication with one ISP, and a trunk and signaling network interconnecting each SCP and SSP, wherein the AIN is operative to provide at least one existing service to users, a method for determining existing service and new service provisioning capacity comprising:

automatically acquiring existing service demand and component usage information for each SCP and each SPACE system from the AIN;

specifying service demand and component usage information for each ISP;

updating a configuration description for each of the at least one SCP having a modified configuration;

specifying a call processing record for each new service if any new service exists;

specifying time of day usage for each service;

selecting a city in the region;

determining demand forecasts for each new service in the selected city if any new service exists;

repeating selecting a city and determining demand forecasts for each city in the selected region; and determining utilization for at least one of a set including each SCP, each ISP, and each SPACE system, the utilization indicative of provisioning capacity.

2. A method for determining capacity provisioning in an AIN as in claim 1 further comprising:

selecting at least one service from a set including existing services and new services to be used in determining utilization; and specifying a time range over which utilization will be determined.

3. A method for determining capacity provisioning in an AIN as in claim 1 wherein automatically acquiring existing service demand and component usage information from the AIN comprises:

periodically extracting and storing time usage data from each SPACE system;

periodically extracting and calls per customer data from each SCP; and loading the stored time usage data and the stored calls per customer data.

4. A method for determining capacity provisioning in an AIN as in claim 1 wherein the AIN includes cities in more than one time zone, determining utilization comprises normalizing time in each city to compensate for time differences across the more than one time zone.

5. A method for determining capacity provisioning in an AIN as in claim 1 further comprising storing changes to service demands and to time of day usage in a change log.

6. In an advanced intelligent network (AIN) comprising at least one intelligent service control point (SCP), each SCP having a configuration, a service provisioning and creation environment (SPACE) system in communication with each SCP, at least one intelligent service peripheral (ISP), each ISP in communication with one SCP, a plurality of SSPs providing connections into the AIN to users, each SSP in communication with one ISP, and a trunk and signaling network interconnecting each SCP and SSP, wherein the AIN is operative to provide at least one existing service to users, a system for determining existing service and new service provisioning capacity comprising:

a application tool database;

an acquisition module in communication with the AIN and the application tool database, the acquisition module operative to periodically acquire existing service demand data and component usage data from the AIN and to store the service demand data and component usage data in the application tool database; and at least one modeling station, each modeling station operative to (a) load stored service demand data and component usage data from the application tool database,
(b) permit a configuration description to be updated for each of the at least one SCP,
(c) permit a call processing record to be specified for each new service if any new service exists,
(d) permit a time of day usage to be specified for each service,
(e) select a city in the region,
(f) determine demand forecasts for each new service in the selected city,
(g) repeat select a city and determine demand forecasts for each city in the selected region, and
(h) determine utilization for at least one of a set including each SCP, each ISP, and each SPACE system, the utilization indicative of provisioning capacity.

7. A system for determining capacity provisioning in an AIN as in claim 6 wherein each modeling station is further operable to select at least one service from a set including existing services and new services to be used in determining utilization and to specify a time range over which utilization will be determined.

8. A system for determining capacity provisioning in an AIN as in claim 6 wherein the existing service demand data and component usage data acquired by the acquisition module comprises time usage data from each SPACE system and time dependent calls per customer data from each SCP.

9. A system for determining capacity provisioning in an AIN as in claim 6 wherein the AIN comprises cities in more than one time zone, each modeling station further operable to normalize time in each city to compensate for time differences across the more than one time zone.

10. A system for determining capacity provisioning in an AIN as in claim 6 further comprising a change log in communication with each modeling station, the change log operative to store changes to service demands and to time of day usage.

* * * * *